United States Patent [19]

Tanaka

[11] Patent Number: 5,217,734
[45] Date of Patent: Jun. 8, 1993

[54] PET BIRD FEED ADDITIVE AND PROCESS FOR PRODUCING THE SAME

[76] Inventor: Yoshio Tanaka, 22 Banchi, Yamaguchi-cho, Gifu-shi, Gifu-ken, Japan

[21] Appl. No.: 796,963

[22] Filed: Nov. 25, 1991

[30] Foreign Application Priority Data

Mar. 8, 1991 [JP] Japan .................. 3-067678

[51] Int. Cl.$^5$ .............................................. A23K 1/00
[52] U.S. Cl. .................................... 426/2; 426/541; 426/630; 426/635; 426/658; 426/805
[58] Field of Search .......... 426/2, 635, 541, 805, 426/623, 630, 635, 658

[56] References Cited

U.S. PATENT DOCUMENTS

| | | | |
|---|---|---|---|
| 4,554,390 | 11/1985 | Curtain et al. | 426/429 |
| 4,913,915 | 4/1990 | Tanaka | 426/103 |
| 4,915,965 | 4/1990 | Tanaka | 426/98 |

OTHER PUBLICATIONS

Auron et al. "Animal feed supplement containing beta carotene rich Dunaliella algae" Item 8 from file 351 WPI Accession No. 87-308879/44 Nov. 1987.

*Primary Examiner*—R. B. Penland
*Attorney, Agent, or Firm*—Browdy and Neimark

[57] ABSTRACT

A PET bird feed additives in the form of fine granules obtained by mixing 100 parts by weight of a Dunaliella alga powder with 15 to 50 parts by weight of cyclodextrin under stirring and to 100 parts by weight of the mixed adsorbate thus obtained adding an antioxidant and a binder; a PET bird feed obtained by blending 5 to 15 parts by weight of the granules thus obtained with a common PET bird feed; and processes for producing them. In the PET bird feed additive of the present invention, the Dunaliella alga powder is in the form of a mixed adsorbate together with cyclodextrin and thus β-carotene contained in the Dunaliella alga can be stably sustained and effectively utilized. Further, the offensive odor characteristic to the algae can be removed. Furthermore, the PET bird feed additive of the present invention, which is in the form of fine granules, can be easily blended with a common PET bird feed.

6 Claims, No Drawings

PET BIRD FEED ADDITIVE AND PROCESS FOR PRODUCING THE SAME

TECHNICAL FIELD

This invention relates to a PET bird feed additive which comprises a Dunaliella alga powder containing a large amount of β-carotene and cyclodextrin, a PET bird feed containing said additive and processes for producing them.

BACKGROUND OF THE INVENTION

There has been known a feed wherein 0.11 to 4 g of a dry Dunaliella alga powder containing a large amount of β-carotene is added to 1,000 g of a poultry feed in order to improve the color of the yolk of bird's eggs. Further it has been also known to feed female birds with said feed.

SUMMARY OF THE INVENTION

The present inventors have conducted studies in order not to improve the yellow color of the yolk of bird's eggs but to normalize a bird's feathers and to improve the color tone of the same, thus completing the present invention.

The present invention provides a PET bird feed additive which is produced by mixing 100 parts by weight of a Dunaliella alga powder with 15 to 50 parts by weight of cyclodextrin, optionally adding an appropriate amount of water, mixing the resulting mixture under stirring, to 100 parts by weight of the dry mixed adsorbate thus obtained adding 0.10 to 0.25 part by weight of an antioxidant and 35.50 to 40.60 parts by weight of a binder, finely granulating the obtained mixture, and comprises fine granules wherein 100 parts by weight of the Dunaliella alga powder is adsorbed by 15 to 50 parts by weight of cyclodextrin, as well as a process for producing the same.

The present invention further provides a PET bird feed, wherein 5 to 15 parts by weight of the above mentioned fine granules comprising the mixed adsorbate containing 15 to 50 parts by weight of cyclodextrin and 100 parts by weight of the Dunaliella alga powder as the main components is blended with a common PET bird feed, as well as a process for producing the same.

DETAILED DESCRIPTION OF THE INVENTION

In the present invention, the Dunaliella alga powder is absorbed by cyclodextrin in order to protect β-carotene contained in the Dunaliella alga powder, which is easily oxidized, and to exert a masking effect whereby the characteristic odor of the Dunaliella alga powder is removed. The antioxidant may be involved in the mixed adsorbate together with the alga powder.

In the present invention, 15 to 50 parts by weight of cyclodextrin is used per 100 parts by weight of the Dunaliella alga powder. This is because no adsorption is observed by using 15 parts by weight or less of cyclodextrin while the adsorption effect is never improved any more by using more than 50 parts by weight of the same, which is disadvantageous from an economical viewpoint.

In the present invention, 5 to 15 parts by weight of the fine granular feed additive comprising the aforesaid mixed adsorbate is blended with a common feed for PET birds such as canary, shell parakeet, robin, Bengalese, myna bird and paddy birds, which comprises foxtail millet seed, barnyard millet seed, perilla seed, rapeseed, wheat and other components and is in the form of granules or paste food. This is because the addition of less than 5 parts by weight of said feed additive scarcely gives any effect, while the addition of more than 15 parts by weight thereof causes no improvement in the effect any more, which is disadvantageous from an economical viewpoint and, furthermore, might inhibit the intake of the nutrients inherently contained in the feed.

The Dunaliella algae to be used in the present invention involve, for example, Dunaliella bardawil and Dunaliella salina. As the cyclodextrin (simply referred to as CD), on the other hand, α-CD, β-CD, γ-CD, δ-CD, ε-CD, polymer CD and CD sugars may be used. Preferable examples of the antioxidant include vitamins C and E, while preferable examples of the binder include sugars, in particular, reducing maltose.

EXAMPLE

To 100 parts by weight of a Dunaliella bardawil alga power, 30 parts by weight of β-cyclodextrin was added and stirred to thereby give a cyclodextrin mixed adsorbate in the form of fine granules. To 100 parts by weight of this mixed adsorbate, 0.15 part by weight of vitamin E, 35.60 parts by weight of reducing maltose and an appropriate amount of water were added followed by kneading. Then the obtained mixture was granulated with an extruder and dried. Thus a granular feed additive was obtained.

Ten parts by weight of the granular feed additive thus obtained was blended with a shell parakeet feed to thereby give a shell parakeet feed.

Three yellow shell parakeets were fed with a composite feed comprising foxtail millet seed, barnyard millet seed and wheat for one week. As a result, the feathers of the birds, in particular, the head feathers, became rough. Then these birds were fed with another feed obtained by blending 10 parts by weight of the feed additive obtained in this Example with the composite feed comprising foxtail millet seed, barnyard millet seed and wheat for one week. As a result, the feathers of the birds were well settled and the feather color turned to vivid yellow.

After feeding with the feed containing 10 parts by weight of the feed additive obtained in this Example for 2 weeks, the birds were fed with the composite feed comprising foxtail millet seed, barnyard millet seed and wheat again for 2 weeks. Thus the feathers of the birds became rough and the feather color deteriorated. Then they were fed with the feed containing 10 parts by weight of the feed additive of this Example again. As a result, the feathers were normalized and the feather color was improved within one week.

EFFECTS OF THE INVENTION

According to the present invention, a PET bird feed additive, wherein β-carotene contained in Dunaliella algae is stably sustained, the characteristic offensive odor of the algae is removed, and thus the active components are stably sustained, suiting to PET birds' fancy and in the form of fine granules which can be easily blended with conventional granular feeds can be obtained. Furthermore, a useful toy bird feed can be easily produced.

What is claimed is:

1. A method for feeding a pet bird kept in a cage comprising providing a quantity of birdfeed composition consisting essentially of 100 parts of a conventional birdseed and 5-15 parts of a birdfeed supplement, wherein said birdfeed supplement consists of a Dunaliella alga powder, a cyclodextrin, a antioxidant vitamin, a sufficient amount of sugar binder to bind the birdfeed supplement and water, the ratio of said alga powder to said cyclodextrin being 100:15-50.

2. The method of claim 1 wherein said antioxidant vitamin is vitamin C or vitamin E and said sugar binder is maltose.

3. A method for preparing a birdfeed composition for a pet bird kept in a cage comprising blending 5-15 parts of a birdfeed supplement which consists of a Dunaliella alga powder, a cyclodextrin, a antioxidant vitamin, a sufficient amount of a sugar binder to bind the birdfeed supplement and water, the ratio of said alga powder to said cyclodextrin being 100:15-50 with 100 parts of conventional birdseed.

4. The method of claim 3 wherein said antioxidant vitamin is vitamin C or vitamin E and said sugar binder is maltose.

5. A birdfeed composition for a pet bird kept in a cage consisting essentially of 100 parts of a conventional birdseed and 5-15 parts of a birdfeed supplement, wherein said birdfeed supplement consists of a Dunaliella alga powder, a cyclodextrin, a antioxidant vitamin, a sufficient amount of sugar binder to bind the birdfeed supplement and water, the ratio of said alga powder to said cyclodextrin being 100:15-50.

6. The birdfeed composition of claim 5 wherein said antioxidant vitamin is vitamin C or vitamin E and said sugar binder is maltose.

* * * * *